United States Patent [19]

Keast

[11] Patent Number: 5,111,341
[45] Date of Patent: May 5, 1992

[54] DRIVE DEVICE FOR TRUCK MIRROR

[76] Inventor: Russell Keast, Box 605, Innisfail, Alberta, Canada, T0M 1A0

[21] Appl. No.: 567,103

[22] Filed: Aug. 14, 1990

[30] Foreign Application Priority Data

Apr. 6, 1990 [CA] Canada ................................ 2014116

[51] Int. Cl.⁵ .............................................. G02B 7/18
[52] U.S. Cl. ...................................... 359/841; 359/843; 359/877; 359/881; 359/548; 359/900
[58] Field of Search ............... 350/604, 605, 606, 632, 350/637, 639; 248/479, 548, 599, 900

[56] References Cited

U.S. PATENT DOCUMENTS

| | | | |
|---|---|---|---|
| 3,492,065 | 1/1970 | Kurz, Jr. ............................. | 350/633 |
| 3,537,778 | 11/1970 | Kurz, Jr. ............................ | 350/633 |
| 4,456,333 | 6/1984 | Hewitt ................................ | 350/637 |
| 4,787,726 | 11/1988 | Hendricks ........................... | 248/900 |
| 4,834,522 | 5/1989 | Janowicz ............................ | 350/637 |
| 4,955,704 | 9/1990 | Janowicz ............................ | 350/637 |

*Primary Examiner*—Bruce Y. Arnold
*Assistant Examiner*—J. P. Ryan
*Attorney, Agent, or Firm*—George H. Dunsmuir

[57] ABSTRACT

A relatively simple device for turning a mirror on a truck or other automotive vehicle includes a pivot for rotatably supporting one end of the mirror, and a casing on the other end of the mirror. The casing contains a reversible motor and gearbox combination for rotating a threaded shaft, which carries a threaded block. Rotation of the shaft causes movement of the block to rotate an arm connected to the other end of the mirror. A pair of microswitches located in the path of travel of the block limit movement of the block and consequently rotation of the mirror beyond predetermined limits.

5 Claims, 2 Drawing Sheets

_(1)_

DRIVE DEVICE FOR TRUCK MIRROR

BACKGROUND OF THE INVENTION

This invention relates to a mirror turning device, and in particular to a device for turning the exterior mirror on an automotive vehicle.

While the device of the present invention was specifically designed for use on trucks, it will be appreciated that the device could also be used on passenger vehicles having large exterior mirrors of the type used when towing a boat or trailer.

Remote control devices for rotating exterior vehicle mirrors are described, for example by U.S. Pat. No. 3,537,778, which issued to A. W. Kurz, Jr. on Nov. 3, 1967. The Kurz patent discloses a device for rotating a mirror, but provides no indication of whether the device can be used on existing mirror brackets. Moreover, it appears that the Kurz device is somewhat complicated, heavy and requires a large motor for rotating the mirror. Finally, the Kurz device provides safety device for automatically limiting rotation of the mirror beyond predetermined limits, i.e. for preventing damage to the drive motor.

The object of the present invention is to overcome the above defined disadvantages by providing a relatively simple mirror turning device, which can be attached to an existing mirror bracket, and which prevents mirror rotation beyond predetermined limits.

BRIEF SUMMARY OF THE INVENTION

Accordingly, the present invention relates to a device for turning the exterior mirror of an automotive vehicle comprising pivot means for rotatably supporting one end of the mirror; casing means for mounting on one end of the mirror; elongated, threaded shaft means in said casing means; drive means for rotating said shaft means in either direction; block means slidable on said shaft means for longitudinal movement therealong when said shaft means is rotated; arm means pivotally connected at one end to said block means and fixedly connected to said other end of the mirror for rotating the latter when rotation of the shaft means causes longitudinal movement of the block means and rotation of the arm means; and switch means in said casing means for limiting rotation of the arm means and consequently of the mirror carried connected thereto.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT(S)

Figure 1:
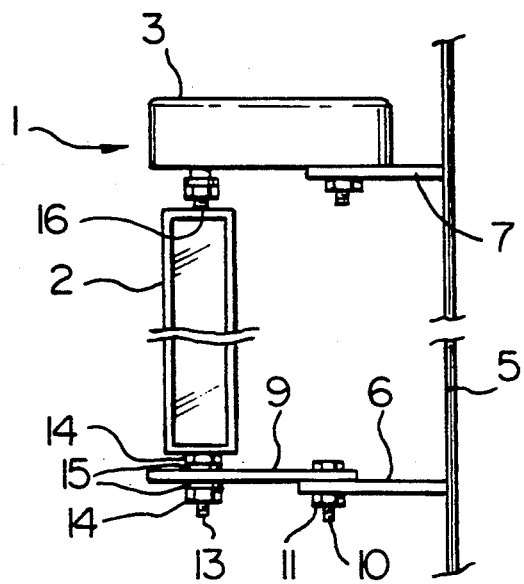
FIG. 1 is a schematic, end elevation view of a truck mirror with a device in accordance with the present invention connected thereto.

With reference to FIG. 1, the mirror turning device of the present invention which is generally indicated at 1 is used to rotate a conventional truck mirror 2. When installing the device on a vehicle (not shown) the casing 3 of the device 1 is connected to a bar of a conventional mirror bracket (not shown), which is mounted on the side of a truck or other vehicle. A pair of arms 6 and 7 extend outwardly from the bracket arm 5. The lower arm 6 carries a bar 9, which rotatably act as a pivot for supporting the bottom end of the mirror 2. The bar 9 is connected to the arm 6 by a bolt 10 and nut 11, and to the bolt 13 extending downwardly from the bottom centre of the mirror 2 by nuts 14 and washers 15. Thus, the mirror 2 is free to rotate on the outer end of the bar 9. The bolt 16 at the top end of the mirror 2 is connected to the device 1 for rotation thereby.

Figure 2:
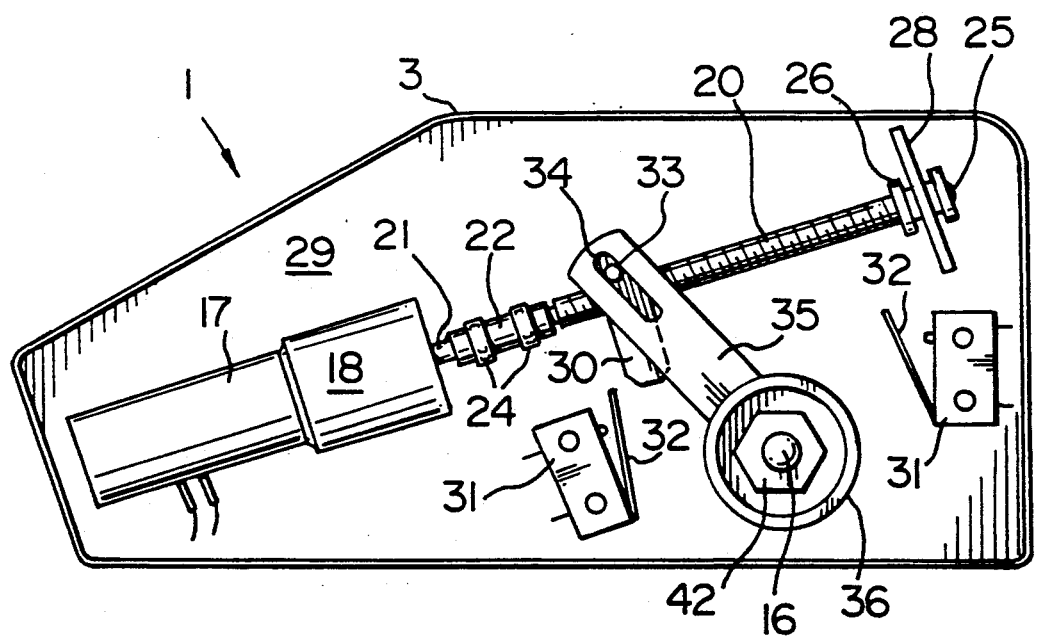
FIG. 2 is a cross-sectional view of the device of FIG. 1.
Figure 3:
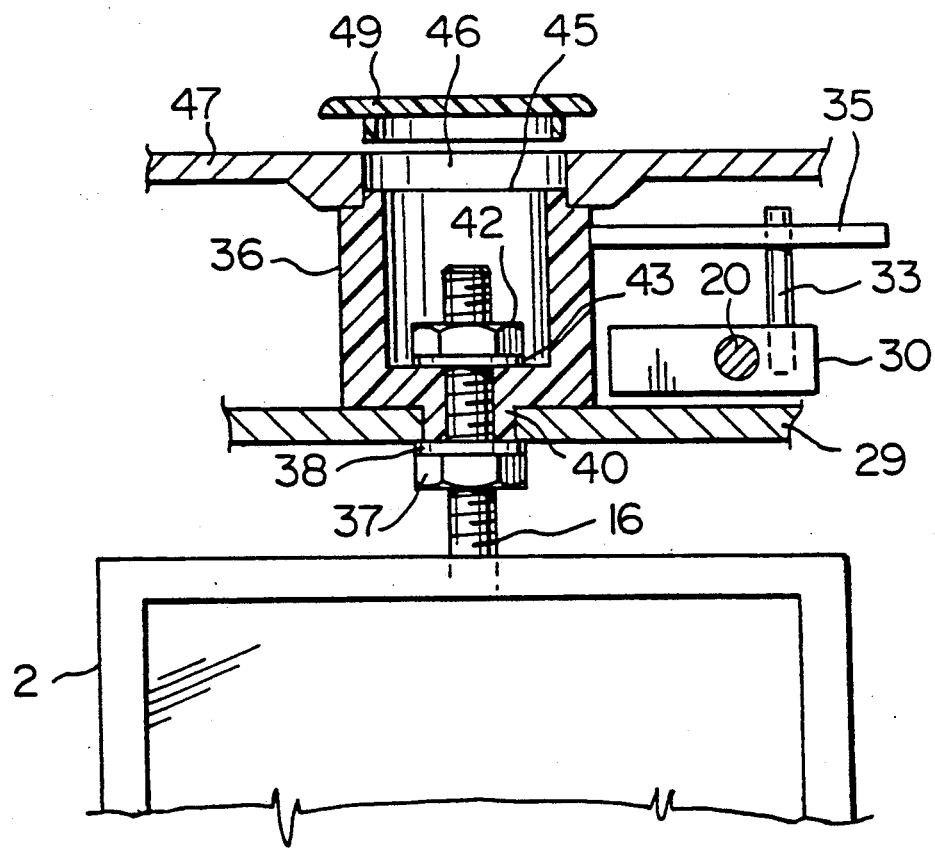
FIG. 3 is a longitudinal sectional view of one end of the device of FIGS. 1 and 2.
Figure 4:
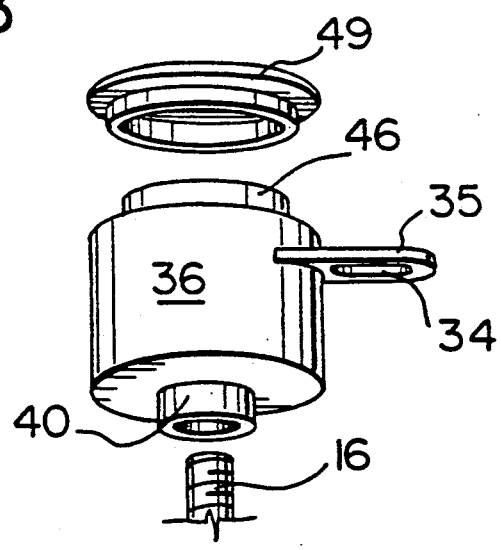
FIG. 4 is an exploded, schematic, perspective view of an arm used in the device of FIGS. 1 to 3.

Referring to FIGS. 2 to 4, the device 1 includes the casing 3, which contains a reversible motor 17 and a gearbox 18 for rotating an elongated, threaded shaft 20. One end of the shaft 20 is connected to the drive shaft 21 extending out of the gearbox 18 by a flexible coupling defined by a sleeve 22 and hose clamps 24. The other end 25 of the shaft 20 extends into a bearing 26 mounted in a plate 28 extending upwardly from the bottom wall 29 of the casing 3.

The shaft 20 carries a block 30, which is internally threaded for movement along the shaft 20 when the latter is rotated by the motor 17 and gearbox 18 combination. Movement of the block 30 in either direction is limited by a pair of microswitches 31, the actuator fingers 32 of which extend into the path of travel of the outer end of the block 30. A pin 33 extends upwardly from the block 30 through a longitudinal extending slot 34 (FIGS. 2 and 4) in one end of a lever 35. The lever 35 forms part of an arm, which includes a cup-shaped sleeve 36 mounted in the casing 3 above the bolt 16. The bolt 16 extends upwardly through a nut 37 and a washer 38 beneath the casing 3, and through a neck 40 (FIGS. 3 and 4) into the bottom end of the sleeve 36. A nut 42 and a washer 43 secure the bolt 16 to the sleeve 36. A narrow neck 45 at the top end of the sleeve 36 extends upwardly into an opening 46 in the top wall 47 of the casing 3. The opening 46, which is normally closed by a removable cap 49, permits access to the bolt 16 for rotating the latter if adjustment is required.

In use, the motor 17 and the switches 31 are wired into an electrical circuit (not shown) including the electrical power supply of a vehicle, and a toggle switch in the cab of the vehicle. When the driver wishes to rotate the mirror, the toggle switch is pressed in one direction or the other to actuate the motor 17, which rotates the shaft 20. The block 30 is thus caused to move along the shaft 20, rotating the arm defined by the lever 35 and the sleeve 36, and consequently the mirror 2. As mentioned above, movement of the block 30 and consequently rotation of the lever is limited by the microswitches 31.

Thus, there has been described a relatively simple mirror turning device for use on automotive vehicles. The device can readily be mounted on the existing mirror and brackets used on trucks and other vehicles.

What is claimed is:

1. Remote control drive means for providing axial rotation of a vehicle mirror comprising:

a) pivot means for rotatably supporting a first end of said mirror;

b) casing means for mounting on a second end of said mirror;

c) threaded shaft means provided with first and second ends, said threaded shaft means fixedly positioned in said casing at each of said shaft ends from longitudinal movement therein;

d) drive means for reversibly rotating said shaft means;

e) block means threadedly mounted on said shaft means and longitudinally movable thereon when said shaft means is rotated;

f) arm means provided with a lost motion slot means for pivotal engagement with a pin means extending outwardly from said movable block means and for fixed engagement to said second end of said mirror thereby providing rotation of said mirror when rotation of said shaft means causes longitudinal movement of said block means and rotation of said arm means; and, g) switch means in said casing for limiting movement of said lever means and consequently of said mirror connected thereto.

2. A drive means as recited in claim 1 and wherein:

a) said switch means includes a pair of spaced apart microswitches, each of said microswitches having an actuator finger extending into the path of travel of said block means for closing said microswitch when said block means contacts said actuator finger after a pre-determined travel limit.

3. A drive means as recited in claim 1 and wherein:

a) said drive means is mounted exterior of said vehicle mirror.

4. A drive means as recited in claim 1 and wherein:

a) said drive means axially aligned with said threaded shaft means.

5. A drive means as recited in claim 4 and wherein:

a) said shaft means first end fixedly attached to said drive means; and, b) said shaft means second end fixedly attached to said casing with a bearing.

* * * * *